(12) United States Patent
Kim et al.

(10) Patent No.: US 9,961,640 B2
(45) Date of Patent: May 1, 2018

(54) COMMUNICATION SYSTEM AND IOT SYSTEM

(71) Applicant: FCI INC, Seongnam-si, Gyeonggi-do (KR)

(72) Inventors: Beomjin Kim, Seongnam-si (KR); David Cohen, Milpitas, CA (US)

(73) Assignee: FCI INC, Seongnam-si (KR)

( * ) Notice: Subject to any disclaimer, the term of this patent is extended or adjusted under 35 U.S.C. 154(b) by 0 days. days.

(21) Appl. No.: 15/443,638

(22) Filed: Feb. 27, 2017

(65) Prior Publication Data

US 2017/0181088 A1   Jun. 22, 2017

Related U.S. Application Data

(63) Continuation-in-part of application No. 14/846,270, filed on Sep. 4, 2015.

(51) Int. Cl.
| | |
|---|---|
| *G08C 17/00* | (2006.01) |
| *H04W 52/02* | (2009.01) |
| *G06F 9/44* | (2018.01) |

(52) U.S. Cl.
CPC ...... *H04W 52/0229* (2013.01); *G06F 9/4416* (2013.01); *H04W 52/0261* (2013.01)

(58) Field of Classification Search
CPC .......... H04W 52/0229; H04W 52/0261; G06F 9/4416
USPC ........................................................ 370/311
See application file for complete search history.

(56) References Cited

U.S. PATENT DOCUMENTS

| | | | | |
|---|---|---|---|---|
| 9,100,917 | B1* | 8/2015 | Vu ......................... | H04W 4/20 |
| 9,430,438 | B2* | 8/2016 | Biskup ................ | G06F 13/4068 |
| 2010/0022277 | A1 | 1/2010 | An et al. | |
| 2011/0258470 | A1* | 10/2011 | Ryoo ....................... | G06F 1/26 |
| | | | | 713/323 |
| 2014/0229727 | A1 | 8/2014 | Jun | |
| 2014/0281623 | A1 | 9/2014 | Zhang et al. | |
| 2015/0026491 | A1 | 1/2015 | Park et al. | |
| 2015/0215864 | A1* | 7/2015 | Thomas ........... | H04W 52/0216 |
| | | | | 455/574 |
| 2015/0254206 | A1* | 9/2015 | Biskup ................ | G06F 13/4068 |
| | | | | 710/110 |

FOREIGN PATENT DOCUMENTS

| | | |
|---|---|---|
| KR | 10-2010-0013922 A | 2/2010 |
| KR | 10-2014-0102070 A | 8/2014 |
| KR | 10-2015-0011737 A | 2/2015 |

* cited by examiner

*Primary Examiner* — Chuong T Ho
(74) *Attorney, Agent, or Firm* — Hauptman Ham, LLP

(57) ABSTRACT

A communication system and an IoT system are provided. The IoT system is applicable to a wireless network system including an access point. The IoT system includes a WiFi module and a GPIO device. The WiFi module is configured to connect to the access point. The GPIO device is configured to provide a plurality of wake-up signals to the WiFi module through a GPIO pin. A predetermined time period between any two of wake-up signals is greater than an interval between two delivery traffic indication messages from the access point. The WiFi module includes a timer and a power management unit, the power management unit drains power to transfer the WiFi module from a sleep mode to a normal mode after the timer receives the wake-up signal.

11 Claims, 10 Drawing Sheets

COMMUNICATION SYSTEM AND IOT SYSTEM

CROSS REFERENCE TO RELATED APPLICATION

This application is a continuation-in-part of the U.S. application Ser. No. 14/846,270 with the title "Method of Saving Power of Station in Wireless Network", filed Sep. 4, 2015. The entire disclosures of each of the above applications are incorporated herein by reference.

BACKGROUND OF THE INVENTION

1. Field of the Invention

The present invention relates to communication system, and more specifically to a communication system and an Internet of Things (IoT) system capable of reducing power consumption.

2. Description of the Prior Art

Wireless networks are widely deployed to provide various communication services such as video, voice, broadcast, messaging, etc. These wireless networks may be capable of supporting communication for multiple users by sharing the available network resources. Examples of such networks include wireless local area networks (WLANs), wireless metropolitan area networks (WMANs), wireless wide area networks (WWANs), and wireless personal area networks (WPANs).

A wireless network may include any number of access points (APs) and any number of stations. An access point may act as a coordinator for communication with the stations. A station may actively communicate with an access point, may be idle, or may be powered down at any given moment depending on the data requirements of the station.

Because most of current handheld stations, such as wireless handheld device, are powered by batteries, power saving has always been the primary issue concerned. There is therefore a need in the art for techniques to reduce the power consumption of a station in a wireless network.

SUMMARY OF THE INVENTION

Exemplary embodiments of the present invention provide a communication system and an Internet of Things (IoT) system capable of reducing power consumption.

According to an exemplary embodiment of the present invention, a communication system, applicable to a wireless network system including an access point, the communication system comprising: a connectivity module, configured to provide a connectivity function for the communication system and being powered off while the communication system is in a sleep mode; a central processing unit, configured to control the communication system and being powered off while the communication system is in the sleep mode; a power management unit, configured to drain power to the central processing unit and the connectivity module and being powered off while the communication system is in the sleep mode; and a timer, configured to periodically power on the power management unit by a predetermined time period and the predetermined time period is greater than an interval between two delivery traffic indication messages from the access point; wherein if the power management unit drains power to the connectivity module and the central processing unit, the communication system operates in a normal mode, and if the power management unit stops draining power to the connectivity module and the central processing unit, the communication system is in the sleep mode.

According to another exemplary embodiment of the present invention, an IoT system, applicable to a wireless network system including an access point, the IoT system comprising: a WiFi module, configured to connect to the access point; and a GPIO device, configured to provide a plurality of wake-up signals to the WiFi module through a GPIO pin, and wherein a predetermined time period between any two of wake-up signals is greater than an interval between two delivery traffic indication messages from the access point; wherein the WiFi module includes a timer and a power management unit, the power management unit drains power to transfer the WiFi module from a sleep mode to a normal mode after the timer receives the wake-up signal.

These and other objectives of the present invention will become apparent to those of ordinary skill in the art after reading the following detailed description of the preferred embodiment that is illustrated in the various figures and drawings.

DETAILED DESCRIPTION OF THE PREFERRED EMBODIMENTS

The power saving techniques described herein may be used for various wireless networks such as WLANs, WMANs, WWANs, WPANs, etc. A WLAN may implement a radio technology such as any defined by IEEE 802.11. A WWAN may be a cellular network such as a Code Division Multiple Access (CDMA) network, a Time Division Multiple Access (TDMA) network, a Frequency Division Multiple Access (FDMA) network, an Orthogonal FDMA (OFDMA) network, a Single-Carrier FDMA (SC-FDMA) network, etc. A WMAN may implement a radio technology such as any defined by IEEE 802.16 such as 802.16e, which is commonly referred to as WiMAX, or IEEE 802.20. A WPAN may implement a radio technology such as Bluetooth. For clarity, the techniques are described below for an IEEE 802.11 WLAN.

Figure 1:
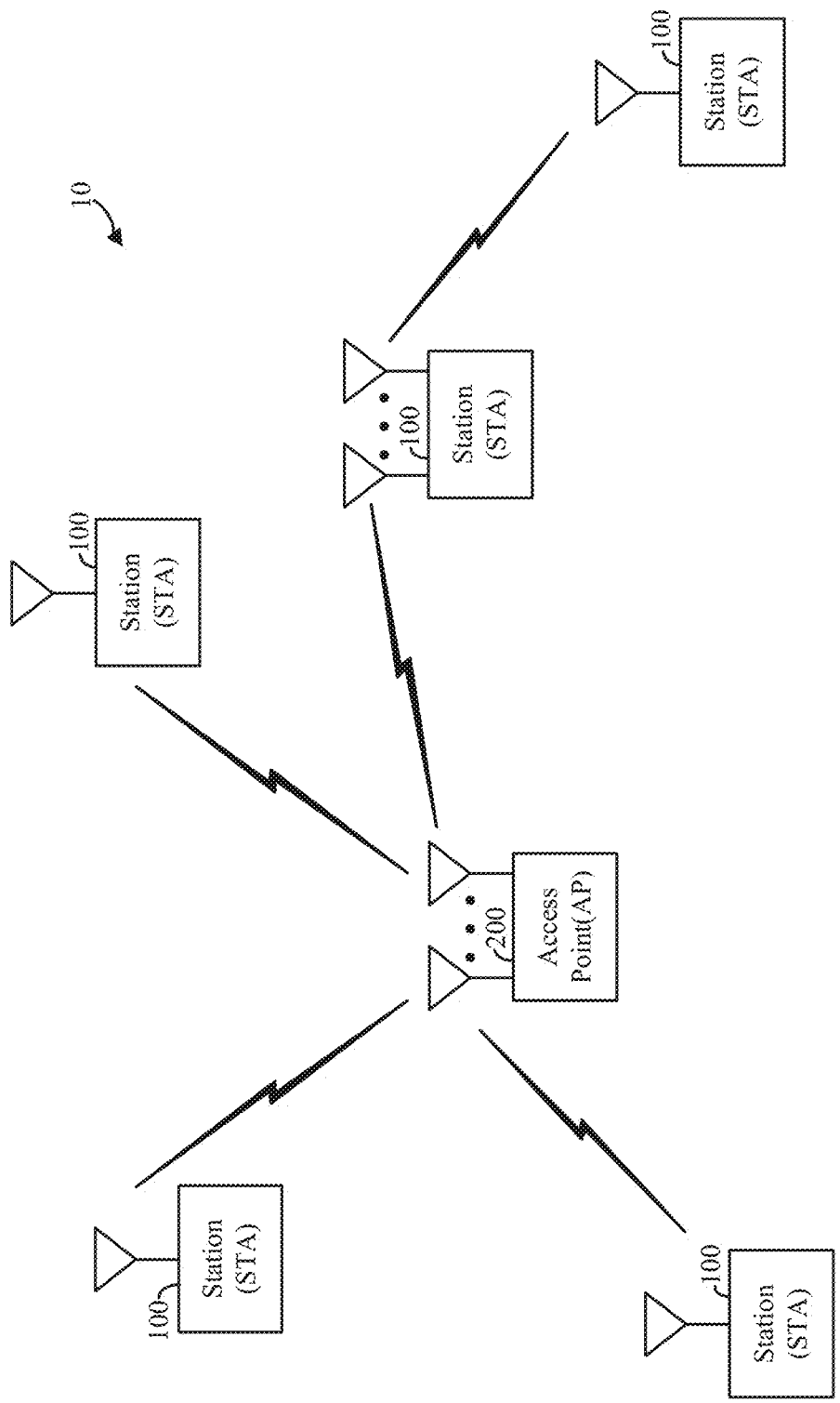
FIG. 1 shows a wireless internet system with an access point and multiple stations according to the present invention.

FIG. 1 shows a wireless internet system 10 according to an exemplary embodiment of the present invention. The wireless internet system 10 includes an access point 200 and five stations 100. In general, the wireless internet system 10 may include any number of access points and any number of stations. The stations 100 may communicate with each other or the access point 200 via a wireless channel. In the exemplary embodiment, the stations 100 may be a mobile phone, a handheld device, a smart phone, a personal digital assistant (PDA), a laptop computer, and so on. The access point 200 may provide access to distribution services via the wireless channel for stations 100 associated with the access point 200. The stations 100 may communicate with the access point 200 for one or more flows which are a higher layer data stream sent via a link. The flows may utilize Transmission Control Protocol (TCP), User Datagram Protocol (UDP), or some other protocol at a transport layer.

The wireless internet system 10 may have a power saving mechanism, such as wireless local area network power saving specified in the IEEE 802.11 standard. The stations 100 may operate in a power saving mode and listen to beacon frames periodically broadcast from the access point 200. If any of the stations 100 is informed by the beacon frame that data packets are buffered at the access point 200, it will send trigger frame to the access point 200 for the queued data packets.

Figure 2:
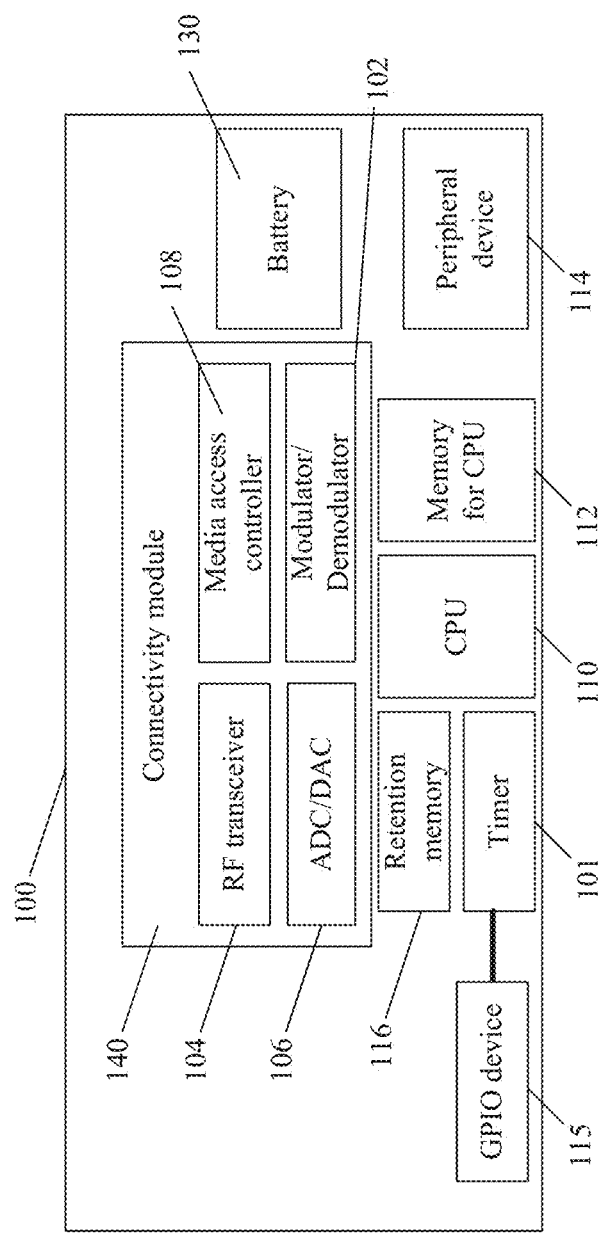
FIG. 2 shows a block diagram of a station according to a preferred embodiment of the present invention.

FIG. 2 shows a block diagram of a station 100 according to a preferred embodiment of the present invention. The station 100 comprises a general purpose input/output (GPIO) device 115, a timer 101, a connectivity module 140, a central processing unit (CPU) 110, a random access memory (RAM) 112 for the CPU 110, a peripheral device 114, a battery 130, and a retention memory 116. The connectivity module 140 is used for connecting to another station when powering on by using specific wireless technology standards, such as WiFi, Bluetooth, Zigbee, and ZWAVE. The connectivity module 140 comprises a modulator/demodulator 102, a radio frequency (RF) transceiver 104, an analog-to-digital converter/digital-to-analog converter (ADC/DAC) 106, and a media access (MAC) controller 108. The peripheral device 114 can be a Universal Serial Bus (USB) device, a screen, a keyboard, or a speaker, but the invention is not limited thereof.

For improving power efficiency, during the period where there is no data transmission to or from the station 100, the station 100 will shut down almost every components and switch to the sleep mode. In the exemplary embodiment, at least one of the GPIO device 115, the timer 101, or the retention memory 116 remain awaken when the station 100 is operating in the sleep mode. In the sleep mode, the duration between two awakenings is referred to as a sleep period. In this embodiment of the present invention, the GPIO device 115 remains enabled. The timer 101 and the retention memory 116 are optionally enabled during the sleep period in another embodiments.

Figure 3:
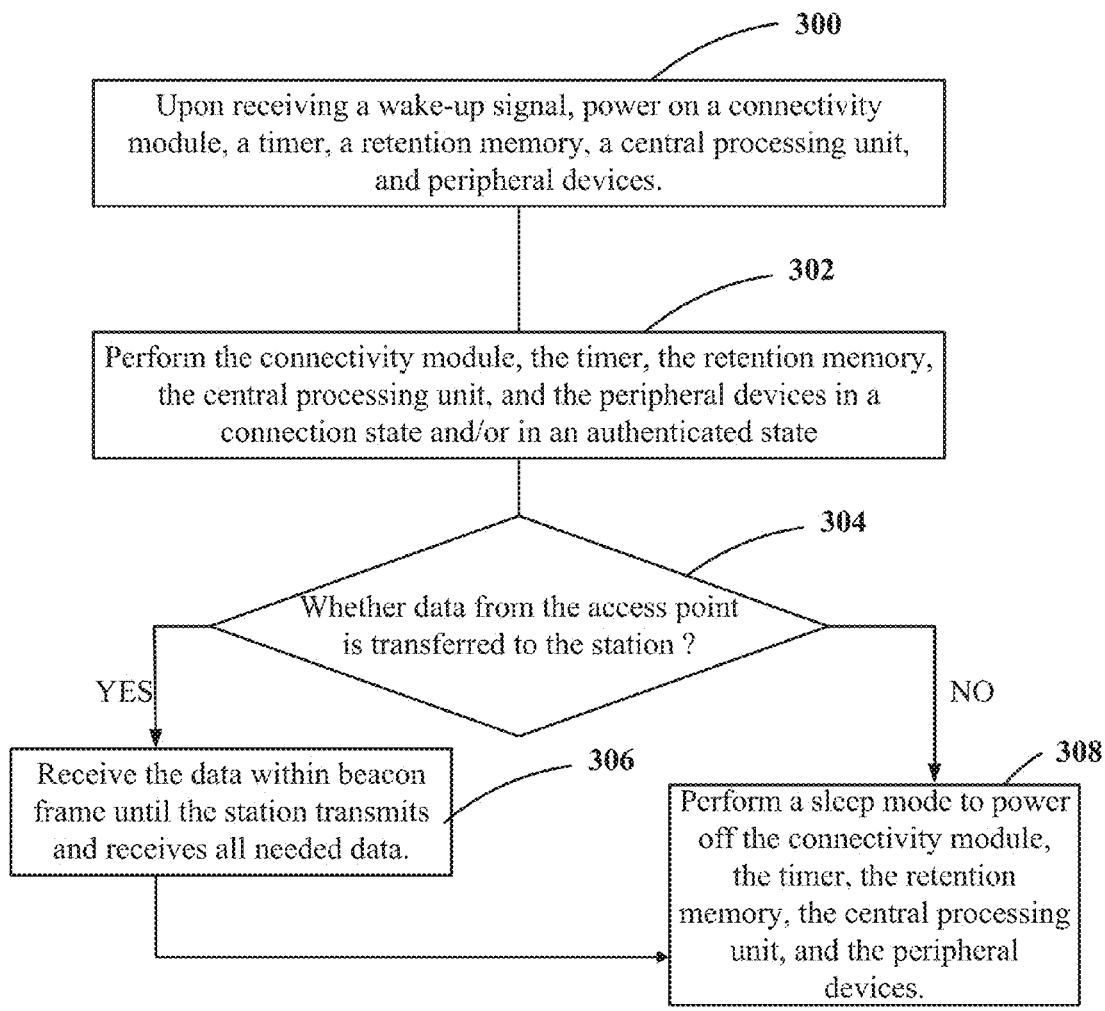
FIG. 3 is a flowchart of a method of saving power of a station in a wireless network according to a first embodiment of the present invention.

Please refer to FIG. 3 in conjunction to FIG. 2. FIG. 3 is a flowchart of a method of saving power of a station in a wireless network according to a first embodiment of the present invention. The method comprises:

Step 300: Upon receiving a wake-up signal, power on the connectivity module 140, the timer 101, the retention memory 116, the central processing unit 110, and the peripheral devices 114.

Step 302: Perform the connectivity module 140, the timer 101, the retention memory 116, the central processing unit 110, and the peripheral devices 114 in a connection state and/or in an authenticated state.

Step 304: Check whether data from the access point 200 is transferred to the station 100.

Step 306: Receive the data along with the beacon frames until the station 100 transmits and receives all needed data.

Step 308: Upon a condition that there is no data to be transferred to the station or after the station transmits and receives all needed data, perform a sleep mode to power off the connectivity module 140, the timer 101, the retention memory 116, the central processing unit 110, and the peripheral devices 114.

In step 300, the GPIO device 115 generates a wake up signal in response to an external event. When receiving the wake up signal, the battery 130 supplies power to power on the connectivity module 140, the timer 101, the retention memory 116, the central processing unit 110, and the peripheral devices 114. In this moment, the central processing unit 110 performs cold booting to initialize the connectivity module 140, the timer 101, the retention memory 116, and the peripheral devices 114.

Figure 4:
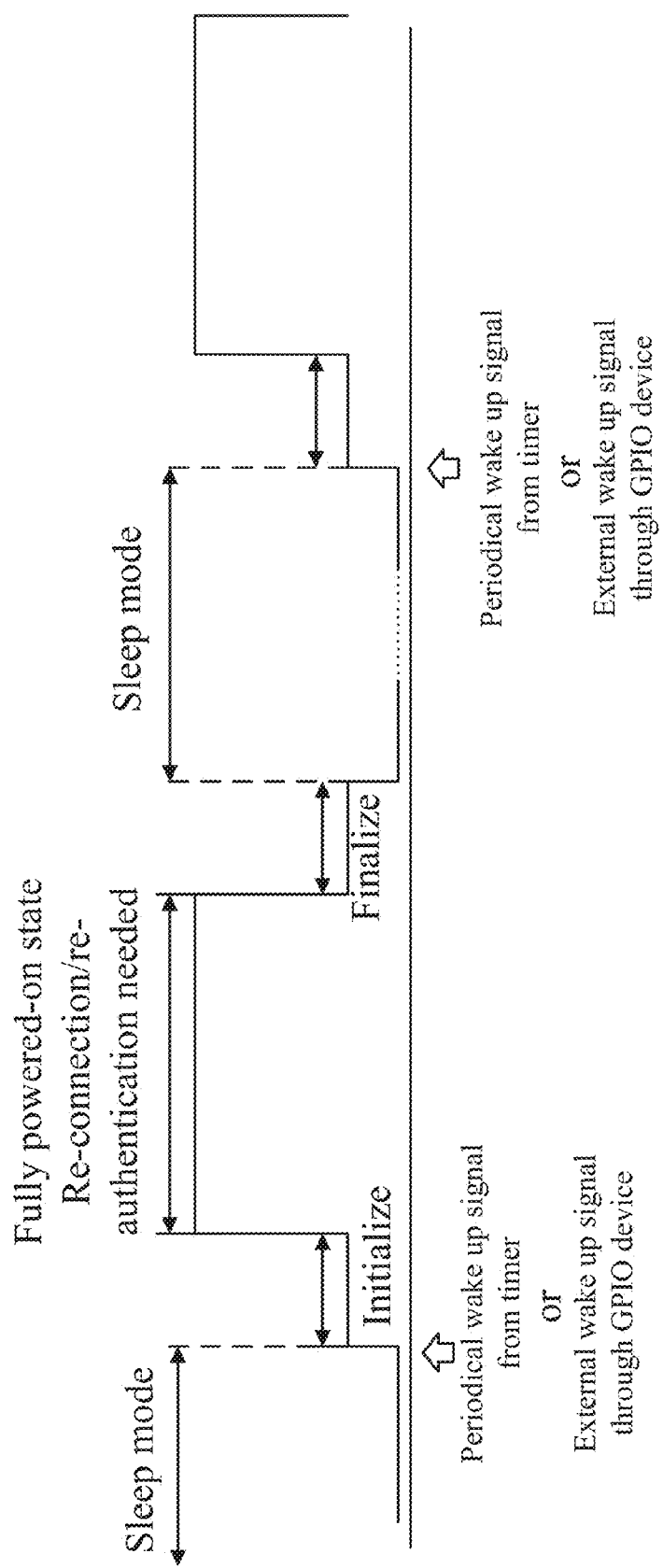
FIG. 4 illustrates a variety of power supply to the station of the present invention.
Figure 5:
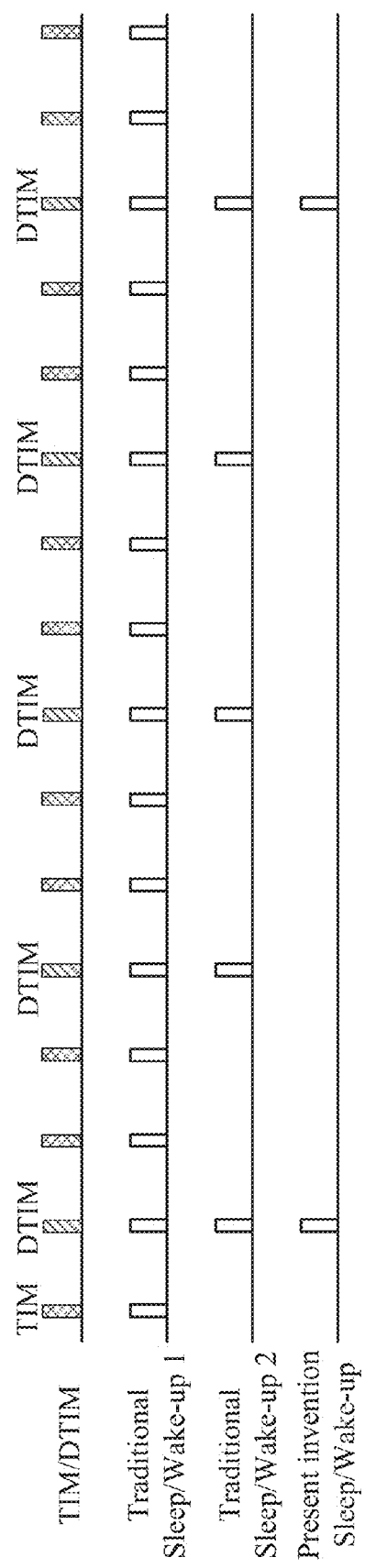
FIG. 5 illustrates a comparison of sleep/wake up modes between conventional technology and the present invention.

Referring to FIGS. 3-5, FIG. 4 illustrates a variety of power supply to the station of the present invention, and FIG. 5 illustrates a comparison of sleep/wake up modes between conventional technology and the present invention. As shown in FIG. 5, the access point 200 shall transmit a Traffic Indication Map (TIM) with every beacon, and for every Delivery Traffic Indication Message (DTIM) period, a TIM of type "DTIM" is transmitted within a beacon. The TIM in a given beacon indicates to the station 100 whether there is pending unicast traffic for that station 100 in the upcoming beacon interval. The DTIM is a bitmap that indicates whether broadcast and multicast traffic is being delivered in the upcoming beacon interval. The DTIM is sent at an interval that is selected by the access point 200. The DTIM interval is typically multiple times the beacon interval and is fixed for a Basic Service Set (BSS), which is a network of stations associated to the access point 200.

Upon the connectivity module 140, CPU 110, and the peripheral devices 114 are under a connection state or an authenticated state, (i.e., the station 100 reconnects the access point 200 or the station 100 re-authenticates the access point 200), broadcast frames or multicast frames buffered in the access point 200 are transferred to the station 100 along with DTIM. Then, the station 100 can detect whether there is data (i.e. buffered broadcast or multicast frames) is transferred along with DTIM. The authenticated state indicates that the station 100 connects to the access point 200 after an authentication process such as logging in or keying in a password.

In step 306, in the case that data (i.e. buffered frames) along with the DTIM is transmitted from the access point 200, the station 100 receives the data along with the beacon frame. In step 308, if there is no data along with DTIM to be transferred from the access point 200, it represents that no data is buffered in the access point 200. The station 100 performs a sleep mode to power off the connectivity module 140, the timer 101, the retention memory 116, the central processing unit 110, and the peripheral devices 114.

Please refer to FIG. 5. Before receiving a TIM or DTIM, the traditional station enables and supplies power from the battery to the elements to be ready for receiving buffered frames in the access points. By contrast, the present invention proposes that a wake up signal is sent from the GPIO device 115 in response to an external event. Upon receiving the wake up signal, the battery 130 supplies power to power on the connectivity module 140, the timer 101, the central processing unit 110, and the peripheral devices 114. Since the interval of the wake up signal sent from the GPIO device 115 in response to the external event is a few multiples of the DTIM intervals, the sleep period of the elements in the station 100 according to the present invention is longer than the conventional DTIM intervals. Therefore, the station using the present invention may save more power and thus make the battery life longer.

Figure 6:
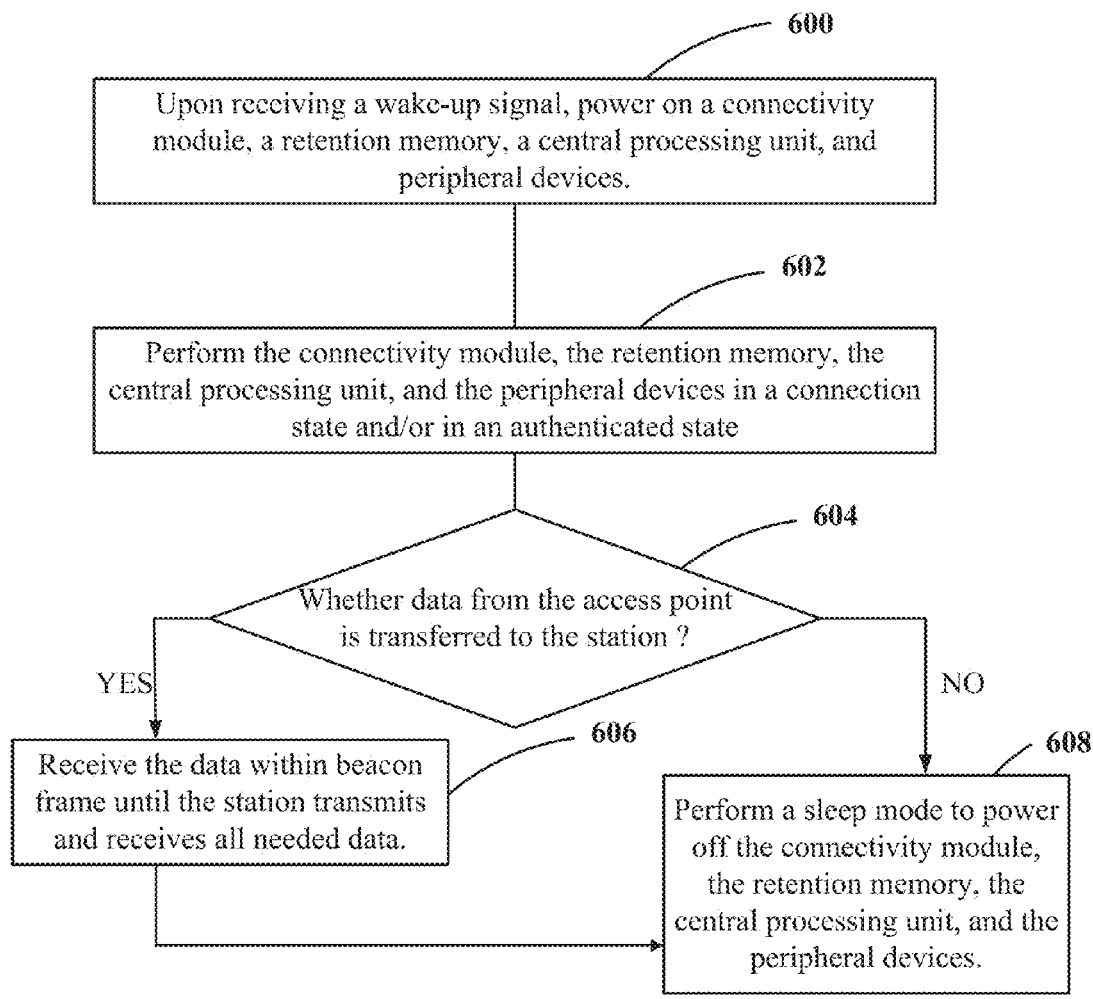
FIG. 6 is a flowchart of a method of saving power of a station in a wireless network according to a second embodiment of the present invention.

Please refer to FIG. 6 in conjunction to FIG. 2. FIG. 6 is a flowchart of a method of saving power of a station in a wireless network according to a second embodiment of the present invention. The method comprises:

Step 600: Upon receiving a wake-up signal, power on the connectivity module 140, the retention memory 116, the central processing unit 110, and the peripheral devices 114.

Step 602: Perform the connectivity module 140, the retention memory 116, the central processing unit 110, and the peripheral devices 114 in a connection state and/or in an authenticated state.

Step 604: Check whether data from the access point 200 is transferred to the station 100.

Step 606: Receive the data within beacon frame.

Step 608: Upon a condition that there is no data to be transferred to the station or after the station transmits and receives all needed data, perform a sleep mode to power off the connectivity module 140, the retention memory 116, the central processing unit 110, and the peripheral devices 114.

In step 600, the GPIO device 115 generates a wake up signal in response to an external event, or the timer 101 periodically generates a wake up signal. The wake-up signal is generated when the timer 101 expires by a predetermined time period such as 5 seconds. The interval of the periodical wake up signal from the timer 101 is a few multiples of DTIM intervals. For example, the interval of the periodical wake up signal from the timer 101 (5 seconds) is 10 times of DTIM intervals (500 mili-seconds). When receiving the wake up signal, the battery 130 supplies power to power on the connectivity module 140, the retention memory 116, the central processing unit 110, and the peripheral devices 114. In this moment, the central processing unit 110 performs cold booting to initialize the connectivity module 140, the retention memory 116, and the peripheral devices 114. Differing from the first embodiment, the timer 101 of the second embodiment enables and periodically generates the wake up signal during the sleep mode.

Upon the connectivity module 140, CPU 110, and the peripheral devices 114 are under a connection state or an authenticated state, (i.e., the station 100 reconnects the access point 200 or the station 100 re-authenticates the access point 200), broadcast frames or multicast frames buffered in the access point 200 are transferred to the station 100 along with DTIM. Then, the station 100 can detect whether there is data (i.e. buffered broadcast or multicast frames) is transferred along with DTIM. The authenticated state indicates that the station 100 connects to the access point 200 after an authentication process such as logging in or keying in a password.

In step 606, in the case that data (i.e. buffered frames) along with the DTIM is transmitted from the access point 200, the station 100 receives the data along with the beacon frame. In step 608, if there is no data along with DTIM to be transferred from the access point 200, it represents that no data is buffered in the access point 200. The station 100 performs a sleep mode to power off the connectivity module 140, the retention memory 116, the central processing unit 110, and the peripheral devices 114.

Please refer to FIG. 5. Before receiving a TIM or DTIM, the traditional station enables and supplies power from the battery to the elements to be ready for receiving buffered frames in the access points. By contrast, the present invention proposes that a wake up signal is sent from the GPIO device 115 in response to an external event or is periodically generated by the timer 101. Upon receiving the wake up signal, the battery 130 supplies power to power on the connectivity module 140, the central processing unit 110, and the peripheral devices 114. Since either the interval of the wake up signal sent from the GPIO device 115 in response to the external event or the interval of the wake up signal periodically generated by the timer 101 is a few multiples of the DTIM intervals, the sleep period of the elements in the station 100 according to the present invention is longer than the conventional DTIM intervals. Therefore, the station using the present invention may save more power and thus make the battery life longer.

Figure 7:
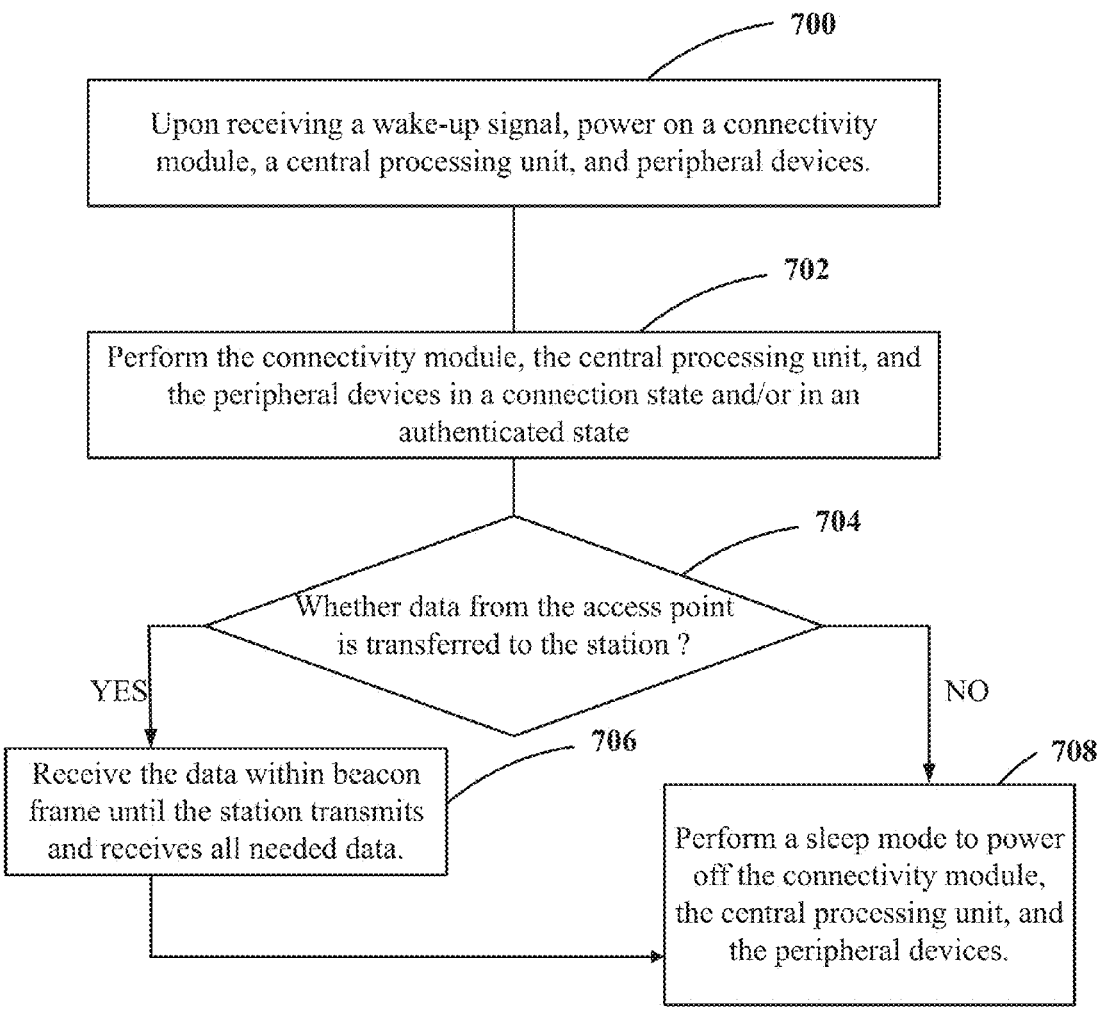
FIG. 7 is a flowchart of a method of saving power of a station in a wireless network according to a third embodiment of the present invention.

Please refer to FIG. 7 in conjunction to FIG. 2. FIG. 7 is a flowchart of a method of saving power of a station in a wireless network according to a third embodiment of the present invention. The method comprises:

Step 700: Upon receiving a wake-up signal, power on the connectivity module 140, the central processing unit 110, and the peripheral devices 114.

Step 702: Perform the connectivity module 140, the central processing unit 110, and the peripheral devices 114 in a connection state and/or in an authenticated state.

Step 704: Check whether data from the access point 200 is transferred to the station 100.

Step 706: Receive the data within beacon frame.

Step 708: Upon a condition that there is no data to be transferred to the station or after the station transmits and receives all needed data, perform a sleep mode to power off the connectivity module 140, the central processing unit 110, and the peripheral devices 114.

In step 700, the GPIO device 115 generates a wake up signal in response to an external event, or the timer 101 periodically generates a wake up signal. The wake-up signal is generated when the timer 101 expires by a predetermined time period such as 5 seconds. The interval of the periodical wake up signal from the timer 101 is a few multiples of DTIM intervals. For example, the interval of the periodical wake up signal from the timer 101 (5 seconds) is 10 times of DTIM intervals (500 mili-seconds). When receiving the wake up signal, the battery 130 supplies power to power on the connectivity module 140, the central processing unit 110, and the peripheral devices 114. In this moment, the central processing unit 110 performs cold booting to initialize the connectivity module 140, and the peripheral devices 114. In another case, the central processing unit 110 performs warm booting to read the relevant information from the retention memory 116 relating to associated states of the central processing unit 110 and the peripheral devices 114, and relating to authenticated states of the connectivity module 140 in a previous operation occurred before the last sleep mode. In this way, the station 100 rapidly recovers to the associated and authenticated states the same as before the last sleep by restoring the relevant information from the retention memory 116 without performing a new association process and a new authentication process to the access point 200 or another station. Differing from the first embodiment, during the sleep mode, the timer 101 of the third embodiment enables and periodically generates the wake up signal, or the retention memory 116 stores relevant information relating to associated states of the central processing unit 110 and the peripheral devices 114, and relating to authenticated states of the connectivity module 140 in a previous operation occurred before the last sleep mode.

Upon the connectivity module 140, CPU 110, and the peripheral devices 114 are under a connection state or an authenticated state, (i.e., the station 100 reconnects the access point 200 or the station 100 re-authenticates the access point 200), broadcast frames or multicast frames buffered in the access point 200 are transferred to the station 100 along with DTIM. Then, the station 100 can detect whether there is data (i.e. buffered broadcast or multicast frames) is transferred along with DTIM. The authenticated state indicates that the station 100 connects to the access point 200 after an authentication process such as logging in or keying in a password.

In step 706, in the case that data (i.e. buffered frames) along with the DTIM is transmitted from the access point 200, the station 100 receives the data along with the beacon frame. In step 708, if there is no data along with DTIM to be transferred from the access point 200, it represents that no data is buffered in the access point 200. The station 100 performs a sleep mode to power off the connectivity module 140, the central processing unit 110, and the peripheral devices 114.

Please refer to FIG. 5. Before receiving a TIM or DTIM, the traditional station enables and supplies power from the battery to the elements to be ready for receiving buffered frames in the access points. By contrast, the present invention proposes that a wake up signal is sent from the GPIO device 115 in response to an external event or is periodically generated by the timer 101. Upon receiving the wake up signal, the battery 130 supplies power to power on the connectivity module 140, the central processing unit 110, and the peripheral devices 114. Since either the interval of the wake up signal sent from the GPIO device 115 in response to the external event or the interval of the wake up signal periodically generated by the timer 101 is a few multiples of the DTIM intervals, the sleep period of the elements in the station 100 according to the present invention is longer than the conventional DTIM intervals. Therefore, the station using the present invention may save more power and thus make the battery life longer.

The method of saving power of the station in the wireless network described herein may be implemented by various means. For example, these techniques may be implemented in hardware, firmware, software, or a combination thereof. For a hardware implementation, the processing units used to perform the techniques at a station may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units used to perform the techniques at an access point may be implemented within one or more ASICs, DSPs, processors, etc.

For a firmware and/or software implementation, the power saving techniques may be implemented with modules (e.g., procedures, functions, etc.) that perform the functions described herein. The firmware and/or software codes may be stored in a memory 112 for CPU 110 in FIG. 2 and executed by a processor (e.g., CPU 110). The memory may be implemented within the processor or external to the processor.

Figure 8:
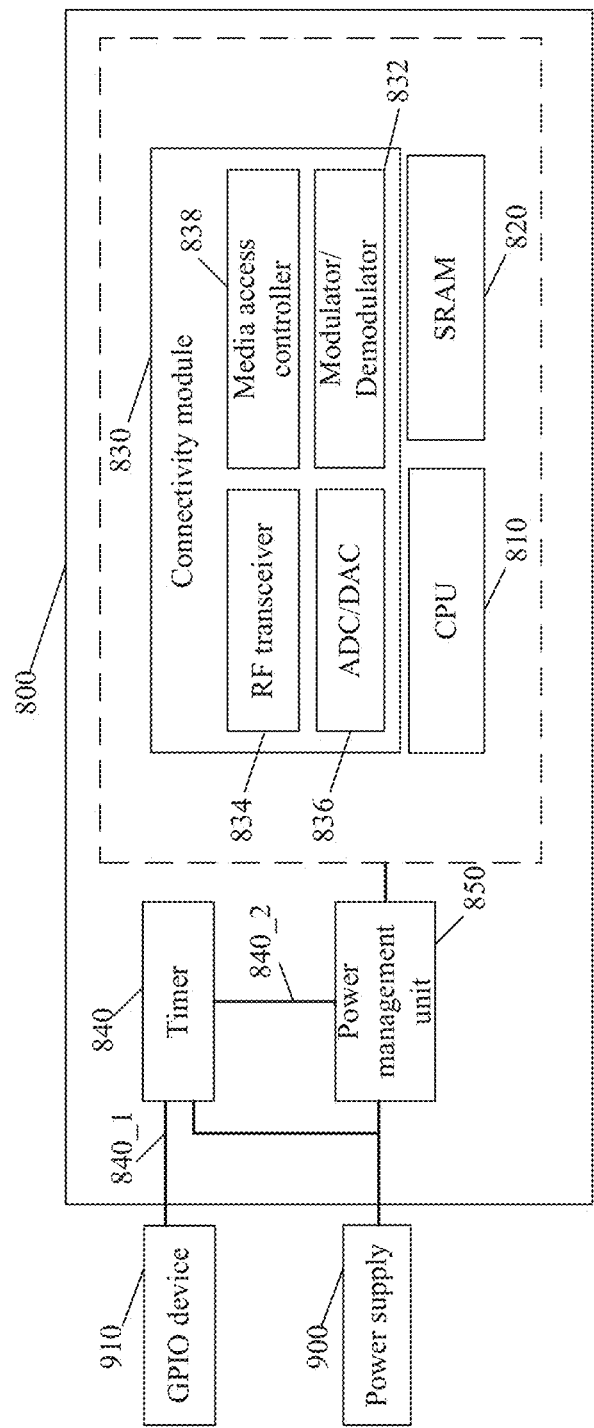
FIG. 8 illustrates a schematic block diagram of a communication system according to an exemplary embodiment of present invention.

Please refer to FIG. 8, which illustrates a schematic block diagram of a communication system according to an exemplary embodiment of present invention. As shown in FIG. 8, the communication system 800 is applicable to a wireless network system including an access point (AP). The communication system 800 includes a central processing unit (CPU) 810, a static random access memory (SRAM) 820, a connectivity module 830, a timer 840 and a power management unit 850. In the exemplary embodiment, the CPU 810 is configured to control the communication system 800. The SRAM 820 is configured to temporary store data for the CPU 810. The connectivity module 830 is configured to provide a connectivity function for the communication system 800. The power management unit 850 is configured to drain power to the CPU 810, the SRAM 820 and the connectivity module 830. It should be noted that, the communication system 800 may operate in a sleep mode or a normal mode. The power consumption of the communication system 800 operating in the sleep mode is lower than the power consumption of the communication system 800 operating in the normal mode. Furthermore, the CPU 810, the SRAM 820, the connectivity module 830 and the power management unit 850 are powered off while the communication system 800 operates in the sleep mode.

The timer 840 is configured to periodically power on the power management unit 850 by a predetermined time period and the predetermined time period is greater than an interval between two delivery traffic indication messages from the access point (not shown). Namely, the timer 840 may periodically power on the power management unit 850, so as to enable the power management unit 850 to drain power to the central processing unit 810, the SRAM 820 and the connectivity module 830. If the power management unit 850 drains power to the CPU 810, the SRAM 820 and the connectivity module 830, the communication system 800 may operate in the normal mode, and if the power management unit 850 stops draining power to the CPU 810, the SRAM 820 and the connectivity module 830, the communication system 800 may operate in the sleep mode. In an exemplary embodiment, the predetermined time period is greater than five times of the interval between two delivery traffic indication messages from the access point, but the invention is not limited thereof. In another exemplary embodiment, the predetermined time period may be greater than ten times of the interval between two delivery traffic indication messages from the access point. In this case, the timer 840 may remain powered on while the communication system 800 operates in the sleep mode, but the invention is not limited thereof.

In the exemplary embodiment, the timer 840 has a first general-purpose input/output (GPIO) pin 840_1 for receiving an external wake-up signal. Upon receiving the external wake-up signal through the first GPIO pin 840_1, the timer 840 may power on the power management unit 850. Then, the power management unit 850 may drain power to the connectivity module 830, the central processing unit 810 and the SRAM 820, so as to transfer the communication system 800 from the sleep mode to the normal mode.

In an exemplary embodiment, the timer 840 is powered off while the communication system 800 is in the sleep mode. Upon receiving the external wake-up signal through the first GPIO pin 840_1, the timer 840 is powered on in response to the external wake-up signal. Then, the timer 840 can powers on the power management unit 850, so as to enable the power management unit 850 to drain power to the connectivity module 830, the central processing unit 810 and the SRAM 820.

In the exemplary embodiment, the timer 840 may connect to a GPIO device 910 through the first GPIO pin 840_1. The GPIO device 910 may be used for detecting an external event, so as to generate an external wake-up signal, and send the external wake-up signal to the timer 840. For example, the GPIO device 910 may pull high the first GPIO pin 840_1 of the timer 840, so as to power on the timer 840. In an exemplary embodiment, the GPIO device 910 may be a touch panel. When the touch panel is being touched by a user, the GPIO device 910 may generate the aforementioned external wake-up signal.

In the exemplary embodiment, the timer 840 has a second GPIO pin 840_2 connected to the power management unit 850. Hence, the timer 840 may periodically send an internal wake-up signal to the power management unit 850 through the second GPIO pin 840_2, so as to power on the power management unit 850. For example, the timer 840 may pull high the second GPIO pin 840_2 connected to the power management unit 850, so as to power on the power management unit 850.

In the exemplary embodiment, the connectivity module 830 may include a modulator/demodulator 832, a radio frequency transceiver 834, an analog-to-digital converter/digital-to-analog converter 836, and a media access controller 838. Furthermore, the connectivity module 830 has a connected state and an authenticated state. Upon operating in the connected state, the connectivity module 830 may perform a connection process with the access point, and upon operating in the authenticated state, the connectivity module 830 may perform an authentication process with the access point. After performing the connection process and/or authentication process, the CPU 810 may store connection information and/or authentication information that the connectivity module 830 receives from the access point in the SRAM 820. In this case, since the SRAM 820 is a kind of volatile memory, if the communication system 800 is under the sleep mode (i.e., the SRAM 820 is powered off), the connection information and/or the authentication information stored in the SRAM 820 is disappear. Hence, if the power management unit drains power to the central processing unit 810 in order to transfer the communication system 800 from the sleep mode to the normal mode, the central processing unit 810 may perform a cold booting process and initializes the connectivity module 830.

In an exemplary embodiment, the communication system 800 may connect to a power supply 900, power supply 900 is used for providing power to the timer 840 and the power management unit 850. In this case, the power supply 900 may continue providing power to the timer 840 and the power management unit 850, even if the timer 840 and the power management unit 850 are powered off. In another exemplary embodiment, the communication system 800 may further include a battery (not shown), the battery is used for providing power to the power management unit 850 and the timer 840. In this case, the battery may continue providing power to the timer 840 and the power management unit 850 even if the timer 840 and the power management unit 850 are powered off.

Figure 9:
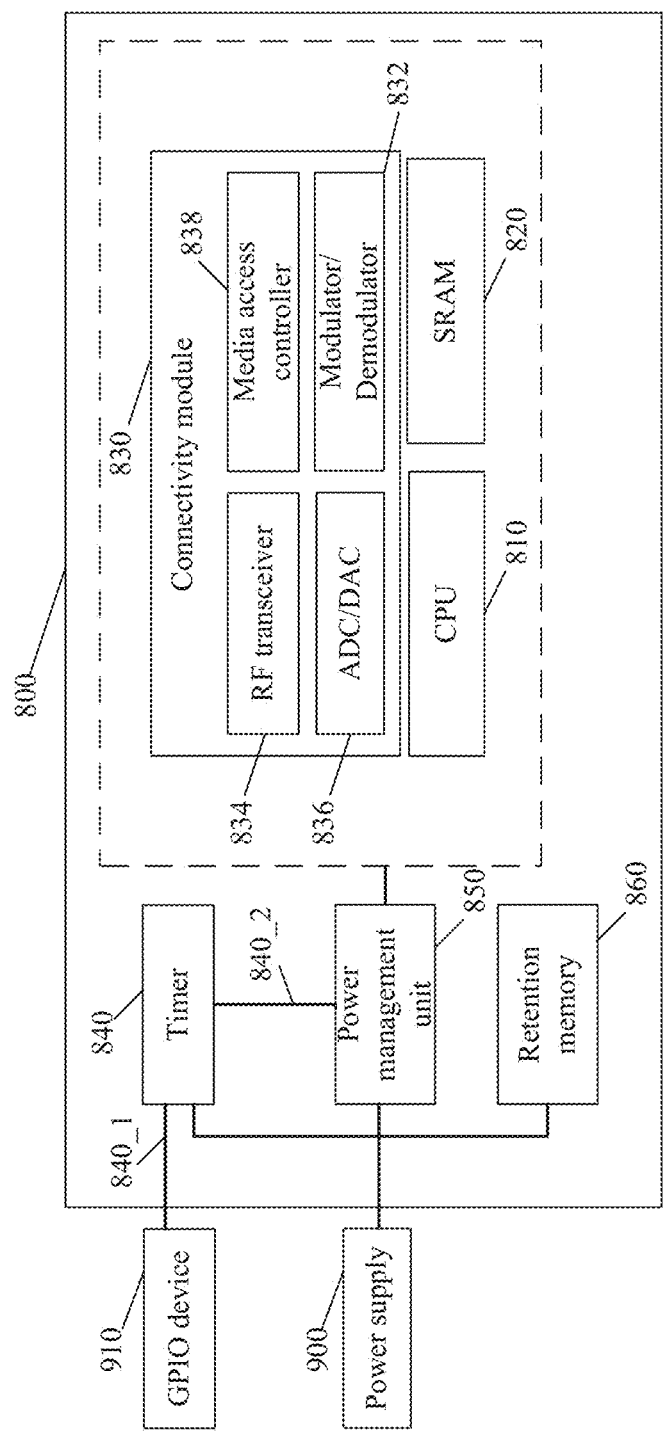
FIG. 9 illustrates a schematic block diagram of a communication system according to another exemplary embodiment of present invention.

In an exemplary embodiment, the communication system 800 may further include a retention memory 860, as shown in FIG. 9. The retention memory 860 is a non-volatile memory which is configured to store authentication information of the connectivity module 830 and/or codes executed by the CPU 810. In this case, the retention memory 860 remains powered on while the communication system is in the sleep mode. Namely, the power supply 900 or the battery may continue providing power to the timer 840, the power management unit 850 and the retention memory 860. In this case, if the power management unit 850 drains power to the CPU 810, the CPU 810 may perform a warm booting process and initializes the connectivity module 830. That is, after performing the connection process and/or authentication process, the CPU 810 may store connection information and/or authentication information that the connectivity module 830 receives from the access point in the retention memory 860, the connection information and the authentication information will not be disappear while the communication system 800 is under the sleep mode. Hence, the communication system 830 does not need to perform the connection process and the authentication process with the access point again, while the communication system 800 transfers from the sleep mode to the normal mode.

In the exemplary embodiment, the communication system 800 can detect whether there is data (i.e. buffered broadcast or multicast frames) transferred along with DTIM received from the access point. If there is no data transferred from the access point exceeding a predetermined idle time, the power management unit 850 may stop draining power to the CPU 810, the SRAM 820 and the connectivity module 830, and then the communication system 800 may operate in the sleep mode. In this case, the timer 840 may power off the power management unit 850, so as to make the power management unit 850 stop draining power to the CPU 810, the SRAM 820 and the connectivity module 830. In an exemplary embodiment, the timer 840 may transmit an internal sleep signal to the power management unit 850 through the second GPIO pin 840_2, and the power management unit 850 powers off in response to the internal sleep signal. For example, the timer 840 may pull low the second GPIO pin 840_2, so as to transmit the sleep signal to the power management unit 850. In another exemplary embodiment, the timer 840 may receive an external sleep signal through the first GPIO pin 840_1, and then the timer 840 may power off the power management unit 850, so as to make the power management unit stop draining power to the CPU 810, the SRAM 820 and the connectivity module 830.

Figure 10:
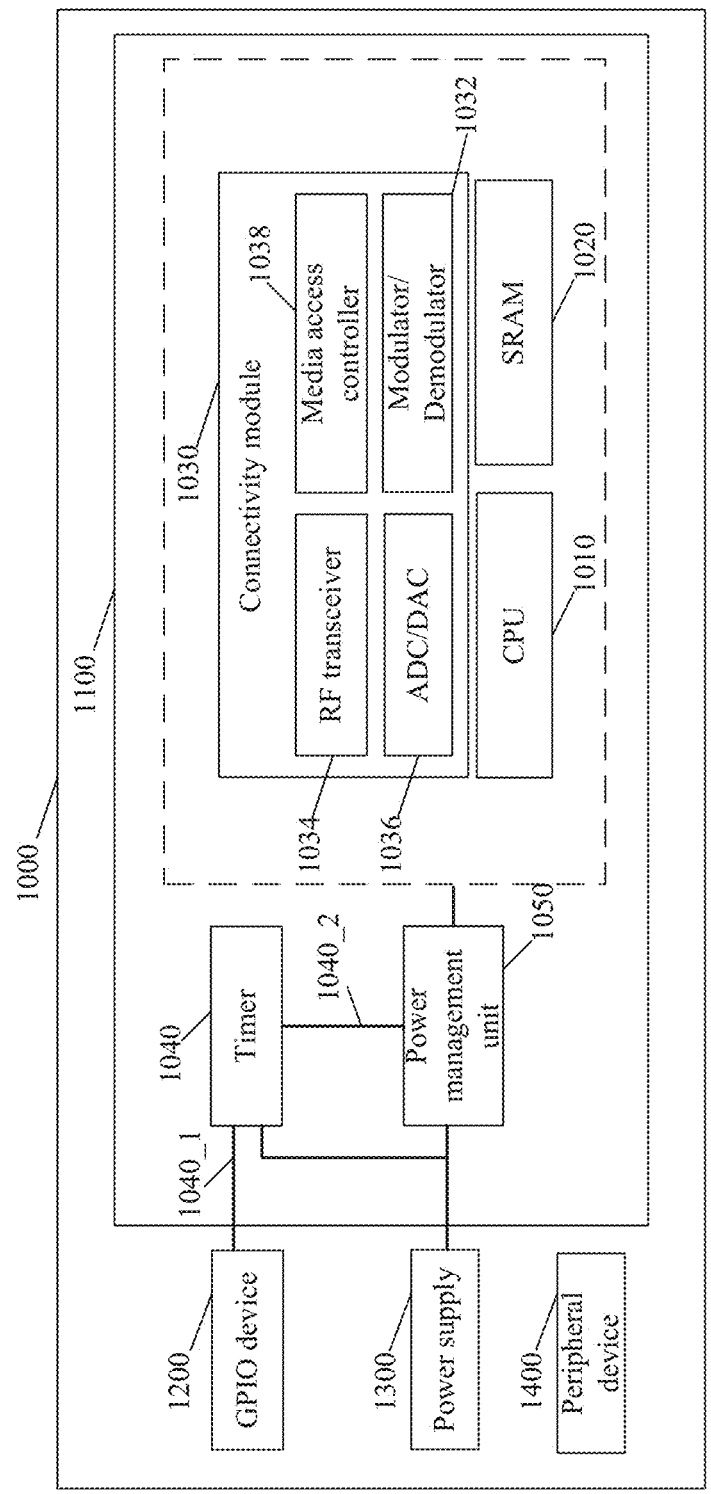
FIG. 10 illustrates a schematic block diagram of an IoT system according to an exemplary embodiment of present invention.

Please refer to FIG. 10, which illustrates a schematic block diagram of an Internet of Things (IoT) system according to an exemplary embodiment of present invention. As shown in FIG. 10, the IoT system 1000 is applicable to a wireless network system including an access point (not shown), the IoT System 1000 includes a WiFi module 1100, a GPIO device 1200, a power supply 1300 and a peripheral device 1400. In this case, the WiFi module 1100 may be implemented in accordance with the communication system 800 of FIG. 8-9, and the WiFi module 1100 is configured to connect to the access point. The GPIO device 1200 is configured to provide a plurality of wake-up signals to the WiFi module 1100 through a GPIO pin (e.g., a first GPIO pin 1140_1 of the timer 1140). The peripheral device 1400 may include a Universal Serial Bus (USB) device, but the present invention is not limited thereof.

In the exemplary embodiment, the predetermined time period between any two of wake-up signals is greater than an interval between two delivery traffic indication messages from the access point. It should be noted that, the WiFi module 1100 may operate in a sleep mode or a normal mode and the power consumption of the WiFi module 1100 operating in the sleep mode is lower than the power consumption of the WiFi module 1100 operating in the normal mode. Besides, the WiFi module 1100 includes a timer 1140 and a power management unit 1150, the power management unit 1150 may drain power to transfer the WiFi module 1100 from the sleep mode to the normal mode after the timer 1140 receives the wake-up signal.

In the exemplary embodiment, the WiFi module 1100 further includes a CPU 1110, a SRAM 1120 and a connectivity module 1130. While the WiFi module 1100 operates in the sleep mode, the CPU 1110, the SRAM 1120, the connectivity module 1130, and the power management unit 1150 are powered off. After receiving the wake-up signal, the timer 1140 may power on the power management unit 1150 and then the power management unit 1150 may drain power to the connectivity module 1130, the CPU 1110 and the SRAM 1120, so as to transfer the WiFi module 1100 from the sleep mode to the normal mode.

In the exemplary embodiment, the timer 1140 is powered off while the WiFi module 1100 is in the sleep mode. Upon receiving the wake-up signal, the timer 1140 is powered on and then the timer 1140 may power on the power management unit 1150, so as to enable the power management unit 1150 to drain power to the CPU 1110, the SRAM 1120 and the connectivity module 1130. If the power management unit 1150 drains power to the CPU 1110, the CPU 1110 may perform a cold booting process and initializes the connectivity module 1130. For example, the GPIO device 1200 may pull high a GPIO pin 1140_1 of the timer 1140, so as to send the wake-up signal to the timer 1140.

In an exemplary embodiment, the timer 1140 remains powered on while the WiFi module 1100 operates in the sleep mode. The timer 1140 may periodically power on the power management unit 1150 by a predetermined time period and the predetermined time period is greater than an interval between two delivery traffic indication messages from the access point. Namely, the timer 1140 may periodically power on the power management unit 1150, so as to enable the power management unit 1150 to drain power to the central processing unit 1110, the SRAM 1120 and the connectivity module 1130. If the power management unit 1150 drains power to the connectivity module 1130, the CPU 1110 and the SRAM 1120, the WiFi module 1100 may operate in the normal mode, and if the power management unit 1150 stops draining power to the connectivity module 1130, the CPU 1110 and the SRAM 1120, the WiFi module 1100 may operate in the sleep mode. In an exemplary embodiment, the predetermined time period is greater than five times of the interval between two delivery traffic indication messages from the access point, but the invention is not limited thereof.

In the exemplary embodiment, the connectivity module 1130 may include a modulator/demodulator 1132, a radio frequency transceiver 1134, an analog-to-digital converter/digital-to-analog converter 1136, and a media access controller 1138. Furthermore, the connectivity module 1130 has a connected state and an authenticated state. Upon operating in the connected state, the connectivity module 1130 may perform a connection process with the access point, and upon operating in the authenticated state, the connectivity module 1130 may perform an authentication process with the access point. After performing the connection process and/or authentication process, the CPU 1110 may store connection information and/or authentication information that the connectivity module 1130 receives from the access point in the SRAM 1120.

In the exemplary embodiment, the power supply 1300 is configured to provide power to the timer 1140 and the power management unit 1150. In this case, the power supply 1300 may continue providing power to the timer 1140 and the power management unit 1150 even if the timer 1140 and the power management unit 1150 are powered off. In another exemplary embodiment, the WiFi module 1100 may further includes a battery (not shown), the battery is used for providing power to the timer 1140 and the power management unit 1150. In this case, the battery may continue providing power to the timer 1140 and the power management unit 1150 even if the timer 1140 and the power management unit 1150 are powered off.

In an exemplary embodiment, the WiFi module 1100 may further include a retention memory (not shown), the retention memory is a non-volatile memory which is configured to store authentication information of the connectivity module 1130 and/or codes executed by the CPU 1110. In this case, the retention memory 1060 may remain powered on while the WiFi module 1100 is in the sleep mode. If the power management unit 1150 drains power to the CPU 1110, the CPU 1110 may perform a warm booting process and initializes the connectivity module. That is, after performing the connection process and/or the authentication process, the CPU 1110 may store connection information and/or authentication information that the connectivity module 1130 receives from the access point in the retention memory 1060. Hence, the WiFi module 1100 does not need to perform the connection process and the authentication process with the access point again, while the WiFi module 1100 transfers from the sleep mode to the normal mode.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A communication system, applicable to a wireless network system including an access point, the communication system comprising:

a connectivity module, configured to provide a connectivity function for the communication system and being powered off while the communication system is in a sleep mode;

a central processing unit, configured to control the communication system and being powered off while the communication system is in the sleep mode;

a power management circuit, configured to drain power to the central processing unit and the connectivity module and being powered off while the communication system is in the sleep mode; and a timer, configured to periodically power on the power management circuit by a predetermined time period and the predetermined time period is greater than an interval between two delivery traffic indication messages from the access point;

wherein if the power management circuit drains power to the connectivity module and the central processing unit, the communication system operates in a normal mode, and if the power management circuit stops draining power to the connectivity module and the central processing unit, the communication system is in the sleep mode.

2. The communication system of claim 1, wherein the timer has a first general-purpose input/output (GPIO) pin for receiving an external wake-up signal, upon receiving the external wake-up signal through the first GPIO pin, the timer powers on the power management circuit.

3. The communication system of claim 2, wherein the timer is powered off while the communication system is in the sleep mode, and upon receiving the external wake-up signal through the first GPIO pin, the timer is powered on in response to the external wake-up signal.

4. The communication system of claim 1, wherein the timer has a second GPIO pin connected to the power management circuit, the timer periodically sends an internal wake-up signal to the power management circuit through the second GPIO pin, so as to power on the power management circuit.

5. The communication system of claim 1, wherein if the power management circuit drains power to the central processing unit, the central processing unit performs a cold booting process and initializes the connectivity module.

6. The communication system of claim 1, wherein the predetermined time period is greater than five times of the interval between two delivery traffic indication messages from the access point.

7. The communication system of claim 1, wherein the communication system further includes a retention memory, the retention memory is configured to store authentication information of the connectivity module and/or codes executed by the central processing unit.

8. The communication system of claim 7, wherein the retention memory is powered on while the communication system is in the sleep mode and if the power management circuit drains power to the central processing unit, the central processing unit performs a warm booting process and initializes the connectivity module.

9. The communication system of claim 1, wherein the connectivity module has a connected state and an authenticated state, upon operating in the connected state, the connectivity module performs a connection process, and upon operating in the authenticated state, the connectivity module performs an authentication process.

10. The communication system of claim 1, wherein the communication system further includes a battery, the battery is used for providing power to the power management circuit and the timer.

11. The communication system of claim 1, wherein the communication system connects to a power supply, so as to drain power from the power supply.

* * * * *